US012794119B2

(12) United States Patent
Shen et al.

(10) Patent No.: US 12,794,119 B2
(45) Date of Patent: Nov. 10, 2026

(54) ANTENNA, ANTENNA ARRAY, AND COMMUNICATION APPARATUS

(71) Applicant: HUAWEI TECHNOLOGIES CO., LTD., Shenzhen (CN)

(72) Inventors: Congsong Shen, Shenzhen (CN); Guolong Huang, Chengdu (CN); Hua Cai, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 219 days.

(21) Appl. No.: 18/679,423

(22) Filed: May 30, 2024

(65) Prior Publication Data

US 2024/0322424 A1 Sep. 26, 2024

Related U.S. Application Data

(63) Continuation of application No. PCT/CN2022/135191, filed on Nov. 29, 2022.

(30) Foreign Application Priority Data

Nov. 30, 2021 (CN) ......................... 202111447711.X

(51) Int. Cl.
*H01Q 3/24* (2006.01)
*H01Q 9/04* (2006.01)

(52) U.S. Cl.
CPC ............. *H01Q 3/24* (2013.01); *H01Q 9/0407* (2013.01)

(58) Field of Classification Search
CPC ............................... H01Q 3/24; H01Q 9/0407
USPC .......................................................... 342/374
See application file for complete search history.

(56) References Cited

U.S. PATENT DOCUMENTS

2016/0218425 A1* 7/2016 Mohamadi ......... H01Q 21/0031
2021/0184358 A1 6/2021 Rodríguez et al.

FOREIGN PATENT DOCUMENTS

| | | | | |
|---|---|---|---|---|
| CN | 105490018 A | 4/2016 | | |
| CN | 106450765 A | 2/2017 | | |
| CN | 106684562 A | 5/2017 | | |
| CN | 110444881 A | 11/2019 | | |
| CN | 113540828 A | * 10/2021 | | H01Q 21/061 |
| WO | 2021128986 A1 | 7/2021 | | |
| WO | WO-2022087357 A1 | * 4/2022 | | A61L 2/082 |

OTHER PUBLICATIONS

Behrouz Babakhani:"A Frequency Agile Microstrip Patch Phased Array Antenna With Polarization Reconfiguration." Jun. 2016. XP011624926, total 12 pages.

* cited by examiner

*Primary Examiner* — Harry K Liu

(57) ABSTRACT

An antenna includes a first and second radiation units coupled with each other. The first radiation unit includes a first switch circuit connected to a feed network. When the first switch circuit is on, a current direction of the first radiation unit is a first direction; or when the first switch circuit is off, a current direction of the first radiation unit is a second direction. The second radiation unit includes a second switch circuit. When the second switch circuit is on, a resonance frequency of the second radiation unit is a first frequency, and a beam direction of the second radiation unit is a third direction; or when the second switch circuit is off, a resonance frequency of the second radiation unit is a second frequency, and a beam direction of the second radiation unit is a fourth direction.

20 Claims, 11 Drawing Sheets

(a) (b)

ANTENNA, ANTENNA ARRAY, AND COMMUNICATION APPARATUS

CROSS-REFERENCE TO RELATED APPLICATIONS

This application is a continuation of International Application No. PCT/CN2022/135191, filed on Nov. 29, 2022, which claims priority to Chinese Patent Application No. 202111447711.X, filed on Nov. 30, 2021. The disclosures of the aforementioned applications are hereby incorporated by reference in their entireties.

TECHNICAL FIELD

Embodiments of this disclosure relate to the field of antenna technologies, and in particular, to an antenna, an antenna array, and a communication apparatus.

BACKGROUND

In a new radio (NR) system, beamforming may be implemented through an active antenna. Beamforming has a long signal transmission distance, a strong anti-interference capability, high frequency utilization, a large system capacity, and other advantages, and also has high costs, high power consumption, and other disadvantages. For these disadvantages, an antenna with a reconfigurable directivity pattern is proposed in the industry, and the antenna can control a beam direction by turning on or turning off a switch circuit, to resolve problems such as high costs and high power consumption of beamforming.

However, due to a structure limitation, the antenna with a reconfigurable directivity pattern cannot directly control a beam phase or cannot implement beam scanning, and an additional active component such as a phase shifter is required for control. Consequently, the antenna with a reconfigurable directivity pattern still needs to depend on the active component, and costs and power consumption cannot be further reduced.

SUMMARY

This disclosure provides an antenna, an antenna array, and a communication apparatus, to control a direction and a phase of a beam without depending on an active component, thereby reducing costs and power consumption to a maximum extent.

According to a first aspect, this disclosure provides an antenna, including a first radiation unit and a second radiation unit coupled to the first radiation unit. The first radiation unit includes a first switch circuit, and the first switch circuit is connected to a feed network. When the first switch circuit is in an on state, a current direction of the first radiation unit is a first direction; or when the first switch circuit is in an off state, a current direction of the first radiation unit is a second direction. The second radiation unit includes a second switch circuit. When the second switch circuit is in an on state, a resonance frequency of the second radiation unit is a first frequency, and a beam direction of the second radiation unit is a third direction; or when the second switch circuit is in an off state, a resonance frequency of the second radiation unit is a second frequency, and a beam direction of the second radiation unit is a fourth direction.

Based on the antenna according to the first aspect, it can be learned that the first switch circuit may be turned on or turned off to control a current direction of the first radiation unit, that is, to control a beam phase, and the second switch circuit may be turned on or turned off to control a beam direction, so that the direction and the phase of the beam can be controlled without depending on an active component, thereby reducing costs and power consumption to a maximum extent.

In a solution, the second switch circuit may be connected to a floor, and the second switch circuit may be turned on or turned off to control whether the second radiation unit is grounded. If the second radiation unit is grounded, the resonance frequency of the second radiation unit is at a high frequency (e.g. the first frequency). For example, the resonance frequency of the second radiation unit is higher than a resonance frequency of the first radiation unit, and a direction function is implemented, that is, a beam is guided to deflect toward a second radiation unit direction (e.g. the third direction). If the second radiation unit is not grounded, the resonance frequency of the second radiation unit is at a low frequency (e.g. the second frequency). For example, the resonance frequency of the second radiation unit is lower than the resonance frequency of the first radiation unit, and a reverse function is implemented, that is, a beam is guided to deflect toward a first radiation unit direction (e.g. the fourth direction). In other words, the second radiation unit may be grounded or not to conveniently control the beam direction.

Optionally, the second radiation unit may further include a ground point, the ground point is connected to the floor, and the second switch circuit is connected to the ground point. In this way, by disposing the ground point, the second radiation unit can be grounded more reliably, and beam direction control can be more stable.

The second radiation unit may further include a second radiation patch, and the second switch circuit is separately connected to the second radiation patch and the ground point. The second radiation patch is electromagnetically coupled to the first radiation unit, to transmit a beam with a deflected direction.

Further, the second radiation patch may be of a ring structure, so that the ground point can be disposed in a ring of the second radiation patch. Therefore, the second switch circuit and a control circuit corresponding to the second switch circuit can be disposed in a gap between the ground point and the second radiation patch.

Further, a shape of the second radiation patch may be any one of the following: an octagon, a rectangle, a circle, or a rhombus. In this way, the second radiation patch and the first radiation unit can achieve good electromagnetic coupling effect, to ensure a gain of the antenna and implement large-angle beam direction control. For example, the beam direction of the antenna is controlled to deflect in a range such as −30° to 30°, −40° to 40°, −45° to 45°, or −30° to 45°.

Further, a ratio of a size of the ground point to a size of the second radiation patch may be 0.3 to 0.75. Therefore, when the second radiation patch is grounded based on the second switch circuit, the resonance frequency of the second radiation patch, that is, the first frequency, may be at a higher frequency range compared with the resonance frequency of the first radiation unit, so that a better direction function is implemented, and large-angle beam direction control is implemented.

In a solution, the first direction and the second direction may be opposite to each other, to implement beam phase control in a large range, for example, 0° and 180°.

Optionally, the first radiation unit may further include a feed point, the feed point is connected to the feed network, and the first switch circuit is connected to the feed point. It may be understood that, by disposing the feed point, it can be ensured that a connection between the second radiation unit and a signal source, that is, the feed network, is more reliable, to obtain a stable signal.

The first radiation unit may further include a first radiation patch, and the first switch circuit is separately connected to the first radiation patch and the feed point. The first radiation patch is electromagnetically coupled to the second radiation unit, to implement beam direction control.

Further, the first radiation patch may be of a ring structure. Therefore, when the first switch circuit is turned on or turned off, a current direction of the first radiation patch can be changed, to implement beam phase control.

Further, a shape of the first radiation patch may be any one of the following: an octagon, a rectangle, a circle, or a rhombus. In this way, the first radiation patch and the second radiation unit can achieve good electromagnetic coupling effect, to ensure a gain of the antenna and implement large-angle beam direction control. For example, the beam direction of the antenna is controlled to deflect in a range such as −30° to 30°, −40° to 40°, −45° to 45°, or −30° to 45°.

In a solution, a ratio of a size of the second radiation unit to a size of the first radiation unit is 1.05 to 1.25. In this way, the first radiation unit and the second radiation unit can achieve good electromagnetic coupling effect, to ensure a gain of the antenna and implement large-angle beam direction control.

In a solution, a ratio of a distance between a center of the first radiation unit and a center of the second radiation unit to a size of the first radiation unit is 1.05 to 1.4. In this way, the first radiation unit and the second radiation unit can achieve good electromagnetic coupling effect, to ensure a gain of the antenna and implement large-angle beam direction control.

In a solution, there may be a plurality of second radiation units, to implement multi-beam direction control.

According to a second aspect, this disclosure provides an antenna array, including a plurality of antennas according to the first aspect.

It should be noted that, when antennas form an antenna array, if a beam phase of a first radiation unit changes, a mirror beam may be generated. For example, through 1-bit phase shift, the beam phase changes between 0° and 180°. In this case, when a beam direction is 35°, a mirror beam with an equivalent gain is generated in a direction of −35°, which causes a decrease in a gain of the antenna array and affects an anti-interference capability of the antenna array. However, when a beam direction of a second radiation unit changes, a negative gain is generated at a beam mirror location. For example, when the beam direction is 35°, the negative gain is generated in a direction of −35°. The negative gain may be superimposed with the mirror beam to suppress the mirror beam. In other words, functions of the first radiation unit and the second radiation unit are not independent of each other, and function cooperation between the first radiation unit and the second radiation unit can suppress the mirror beam, so that a beam directivity pattern of the antenna array has no grating lobe, thereby improving a gain of the antenna array and enhancing an anti-interference capability of the antenna array.

In a solution, a ratio of a distance between two adjacent antennas in the plurality of antennas to a wavelength is 0.7 to 1, and the wavelength is a wavelength corresponding to an operating frequency of the antenna array. It should be noted that, in a conventional phased array antenna, two adjacent antennas need to be arranged at a distance of 0.5 times a wavelength, to suppress a mirror beam, so that an array directivity pattern has no grating lobe. For the antenna array according to the second aspect, each antenna in the antenna array may suppress a mirror beam through function cooperation between two radiation units of the antenna, for example, the first radiation unit and the second radiation unit, so that an array directivity pattern has no grating lobe. In this way, the distance between the two adjacent antennas in the antenna array may be larger. For example, the distance is 0.7 to 1 wavelength. Under a same aperture of the antenna, a quantity of antennas in the antenna array is less than a quantity of antennas in the conventional phased array antenna, to reduce complexity and costs.

It may be understood that, for another technical effect of the antenna array in the second aspect, refer to the technical effect of the antenna in the first aspect. Details are not described again.

According to a third aspect, this disclosure provides a communication apparatus, including the antenna array according to the second aspect.

In a solution, the communication apparatus according to the third aspect further includes a processor and a memory connected to the processor.

It may be understood that, for technical effect of the communication apparatus according to the third aspect, refer to the technical effect of the antenna according to the first aspect and the technical effect of the antenna array according to the second aspect. Details are not described again.

DESCRIPTION OF EMBODIMENTS

Figure 1:
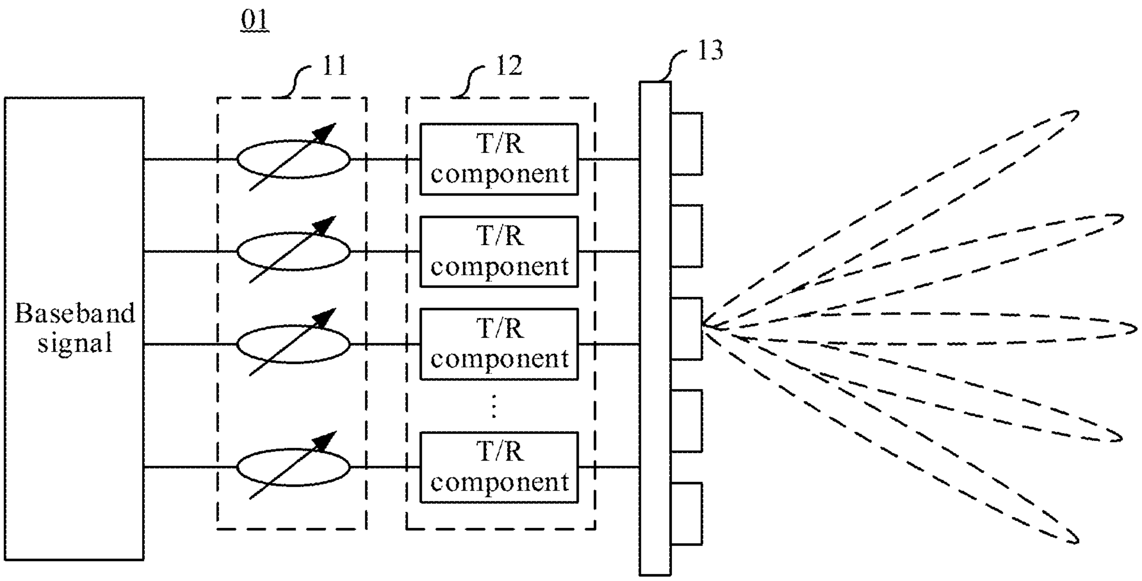
FIG. 1 is a diagram of a structure of an active antenna.

In embodiments of this disclosure, a word such as "example" or "for example" is used to indicate an example, an instance, or descriptions. Any embodiment or design solution described as an "example" or "for example" in embodiments of this disclosure should not be explained as being more preferred or having more advantages than another embodiment or design solution. Exactly, use of the word such as "example" or "for example" is intended to present a related concept in a specific manner.

Terms "first" and "second" in embodiments of this disclosure are merely intended for a purpose of description, and shall not be understood as an indication or implication of relative importance or implicit indication of a quantity of indicated technical features. Therefore, a feature limited by "first" or "second" may explicitly or implicitly include one or more features. In embodiments of this disclosure, orientation terms such as "upper", "lower", "left", and "right" may include but are not limited to definitions based on illustrated orientations in which components in the accompanying drawings are placed. It should be understood that these directional terms may be relative concepts, are used for description and clarification of relative locations, and may vary accordingly depending on a change in the orientations in which the components in the accompanying drawings are placed in the accompanying drawings.

It should be understood that the terms used in the descriptions of the various examples in this specification are merely intended to describe examples and are not intended to impose a limitation. As used in the descriptions of the various examples, singular forms "one ("a" and "an")" and "the" are intended to also include plural forms, unless otherwise explicitly indicated in the context.

In this disclosure, "at least one" means one or more, and "a plurality of" means two or more. In addition, "at least one of the following items (pieces)" or a similar expression thereof means any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be further understood that a term "and/or" used in this specification indicates and includes any or all combinations of one or more of the associated listed items. The term "and/or" describes an association relationship between associated objects and represents that three relationships may exist. For example, A and/or B may represent the following three cases: Only A exists, both A and B exist, and only B exists. In addition, a character "/" in this disclosure generally indicates an "or" relationship between the associated objects.

It should be further understood that, in this disclosure, unless otherwise specified and limited, a term "connection" should be understood broadly. For example, "connection" may be a fixed connection, a sliding connection, a detachable connection, an integrated connection, or the like; or may be a direct connection; or may be an indirect connection by using an intermediate medium.

It should be further understood that a term "include" (also referred to as "includes", "including", "comprises", and/or "comprising") used in this specification specifies presence of the stated features, integers, steps, operations, elements, and/or components, with presence or addition of one or more other features, integers, steps, operations, elements, components, and/or components thereof not excluded.

It should be understood that "an embodiment", "another embodiment", and "a manner" mentioned in the entire specification mean that particular features, structures, or characteristics related to the embodiment or the implementation are included in at least one embodiment of this disclosure. Therefore, "in an embodiment of this disclosure", "in another embodiment of this disclosure", and "a manner" that appear throughout this specification do not necessarily refer to a same embodiment. In addition, these particular features, structures, or characteristics may be combined in one or more embodiments by using any appropriate manner.

This disclosure provides an antenna, an antenna array, and a communication apparatus, to control a direction and a phase of a beam without depending on an active component, thereby reducing costs and power consumption to a maximum extent.

For ease of understanding of the technical solutions of this disclosure, the following describes some technical terms in this disclosure.

1. Active Antenna

In a 5th generation (5G) mobile communication system, an antenna has been developed from a passive antenna to an active antenna, for example, an active phased array antenna 1, to implement beamforming.

FIG. 1 is a diagram of a structure of an active phased array antenna 01. The active phased array antenna 01 may include an antenna array 11, a transmit (T)/receive (R) component 12, and a phase shifter 13. After the phase shifter 13 adjusts a phase of a baseband signal, interference superposition of an electromagnetic wave is performed to perform spatial beam combination, to implement spatial beamforming, thereby improving an anti-interference capability of a system, increasing a transmission distance, improving spectrum utilization, and significantly improving a system capacity. However, because there are a large quantity of active components, such as the phase shifter 13 and the T/R component 12, the active phased array antenna 01 has high costs and high power consumption.

2. Antenna with a Reconfigurable Directivity Pattern

To resolve problems such as high costs and high power consumption of a phased array antenna, an antenna with a reconfigurable directivity pattern is proposed currently. A characteristic of the antenna with a reconfigurable directivity pattern may be changed based on an on or off characteristic of a passive device, such as a diode, a triode (e.g. a bipolar junction transistor (BJT)), a field effect transistor (FET), or a micro-electro-mechanical system (MEMS) switch, to change a beam direction, thereby implementing directivity pattern reconfiguration, that is, beamforming.

Figure 2:
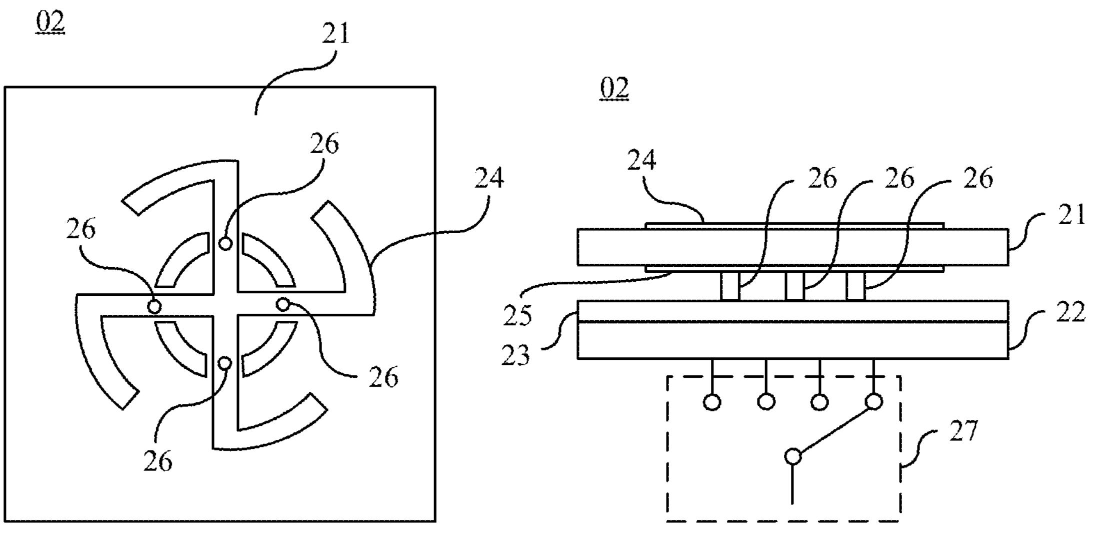
FIG. 2 is a diagram of a structure of an antenna with a reconfigurable directivity pattern.

Refer to FIG. 2. (a) in FIG. 2 is a top view of the antenna with a reconfigurable directivity pattern, and (b) in FIG. 2 is a side view of the antenna with a reconfigurable directivity pattern. The antenna 02 with a reconfigurable directivity pattern may include a first dielectric layer 21, a second dielectric layer 22, a floor 23, a first radiation unit 24, a second radiation unit 25, a feeding structure 26, and a switch 27. The first radiation unit 24 and the second radiation unit 25 are respectively disposed on an upper surface and a lower surface of the first dielectric layer 21. There is an air layer between the first dielectric layer 21 and the second dielectric layer 22. The floor 23 is disposed on the second dielectric layer 22. Four feeding structures 26 coaxially pass through the first radiation unit 24, the first dielectric layer 21, the second radiation unit 25, the floor 23, and the second dielectric layer 22, and are connected to the switch 27 below. The switch 27 is controlled to connect to different feeding structures 26, to change feeding locations, so that current intensity distribution on surfaces of the first radiation unit 24 and the second radiation unit 25 is unbalanced, and a phase difference is formed. Therefore, a beam directivity pattern deflects toward the feeding structures 26 connected to the switch 27, thereby implementing beamforming.

However, a change of a feeding location causes a change of a current direction, which means that a phase changes with directivity pattern adjustment, and consequently independent phase control cannot be implemented. To implement independent phase control, a phase shifter is still required for auxiliary control. As a result, the antenna with a reconfigurable directivity pattern still needs to depend on an active component, and consequently costs and power consumption cannot be further reduced.

For the foregoing technical problems, this disclosure provides the following technical solutions. The following describes the technical solutions of this disclosure with reference to the accompanying drawings.

The technical solutions in embodiments of this disclosure may be applied to various communication systems, for example, a wireless fidelity (Wi-Fi) system, a vehicle to everything (V2X) communication system, a device-to-device (D2D) communication system, an internet of vehicles communication system, a 4th generation (4G) mobile communication system such as a long term evolution (LTE) system, a 5G mobile communication system such as an NR system, and a future communication system such as 6th generation (6G). Certainly, the future communication system may alternatively be named in another manner, which still falls within the scope of this disclosure. This is not limited in this disclosure.

An embodiment of this disclosure provides a communication apparatus. The communication apparatus may be used in the foregoing communication system, and may be a terminal or a network device.

The terminal is a terminal that accesses a network and that has a wireless transceiver function, or a chip or a chip system that can be disposed in the terminal. The terminal may also be referred to as user equipment (UE), an access terminal, a subscriber unit, a subscriber station, a mobile station (MS), a mobile console, a remote station, a remote terminal, a mobile device, a user terminal, a terminal, a wireless communication device, a user agent, or a user apparatus. The terminal in embodiments of this disclosure may be a mobile phone, a cellular phone, a smartphone, a tablet computer (e.g. a Pad), a wireless data card, a personal digital assistant (PDA), a wireless modem, a handheld device (e.g. handset), a laptop computer, a machine type communication (MTC) terminal, a computer that has a wireless transceiver function, a virtual reality (VR) terminal, an augmented reality (AR) terminal, a wireless terminal in industrial control, a wireless terminal in self driving, a wireless terminal in telemedicine or telehealth services, a wireless terminal in a smart grid, a wireless terminal in transportation safety, a wireless terminal in a smart city, a wireless terminal in a smart home, a vehicle-mounted terminal, an RSU that has a terminal function, or the like. Alternatively, the terminal in this disclosure may be a vehicle-mounted module, a vehicle-mounted assembly, a vehicle-mounted component, a vehicle-mounted chip, or a vehicle-mounted unit that is built in a vehicle as one or more components or units.

The network device, for example, an access network device, is a device that is located on a network side of the communication system and that has a wireless transceiver function, or a chip or a chip system that can be disposed in the device. The network device may include a next-generation mobile communication system, for example, a 6G access network device, such as a 6G base station, or a 6G core network element. Alternatively, in the next-generation mobile communication system, the network device may be named in another manner, which falls within the protection scope of embodiments of this disclosure. This is not limited in this disclosure. In addition, the network device may alternatively include a gNB in 5G such as an NR system, or one antenna panel or a group of antenna panels (including a plurality of antenna panels) of a base station in 5G, or may be a network node that forms a gNB, a transmission and reception point (TRP) or a transmission point (TP), or a transmission measurement function (TMF), for example, a baseband unit (BBU), a CU, a DU, a roadside unit (RSU) having a base station function, or a wired access gateway. In addition, the network device may alternatively include an access point (AP) in a wireless fidelity (Wi-Fi) system, a wireless relay node, a wireless backhaul node, macro base stations in various forms, a micro base station (also referred to as a small cell), a relay station, an access point, a wearable device, a vehicle-mounted device, or the like.

Figure 3:
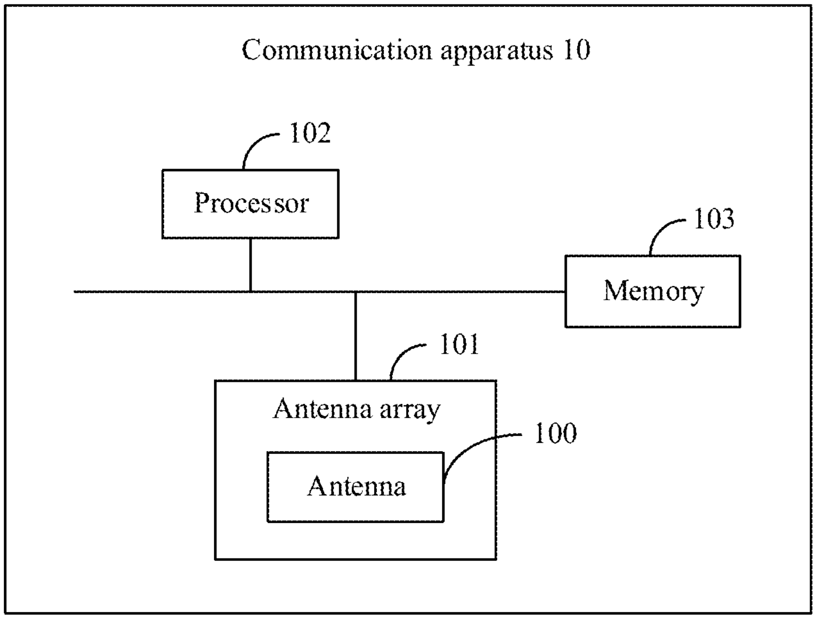
FIG. 3 is a diagram of a structure of a communication apparatus according to an embodiment of this disclosure.

FIG. 3 is a diagram of a structure of a communication apparatus according to an embodiment of this disclosure. The communication apparatus 10 includes an antenna array 101, and may further include a processor 102 and a memory 103 coupled to the processor 102.

The antenna array 101 may include a plurality of antennas 100 (also referred to as antenna elements), and each antenna 100 may be configured to implement a transceiver function of the communication apparatus 10.

The processor 102 is a control center of the communication apparatus 10, and may be one processing element, or may be a general term of a plurality of processing elements, or may be referred to as a logic circuit. For example, the processor 102 is one or more central processing units (CPU), or may be an application-specific integrated circuit (ASIC), or may be one or more integrated circuits configured to implement embodiments of this disclosure, for example, one or more microprocessors (e.g. a digital signal processor (DSP)) or one or more field programmable gate arrays (FPGA). The processor 102 may run or execute a software program stored in the memory 103 and invoke data stored in the memory 103, to perform various functions of the communication apparatus 10, for example, to control the antenna array 101 to transmit a signal or control the antenna array 101 to receive a signal. During implementation, in an embodiment, the processor 102 may include one or more CPUs. In an embodiment, the communication apparatus 10 may alternatively include a plurality of processors 102, and each of the processors 102 may be a single-core processor (single-CPU), or may be a multi-core processor (multi-CPU). The processor 102 herein may be one or more devices, circuits, and/or processing cores configured to process data (for example, computer program instructions).

The memory 103 is configured to store a software program for executing the solutions of this disclosure, and is controlled by the processor 102, so that the communication apparatus 10 can complete various functions, for example, can control the antenna array 101 to transmit a signal or control the antenna array 101 to receive a signal. Optionally, the memory 103 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, this is not limited thereto.

Figure 4:
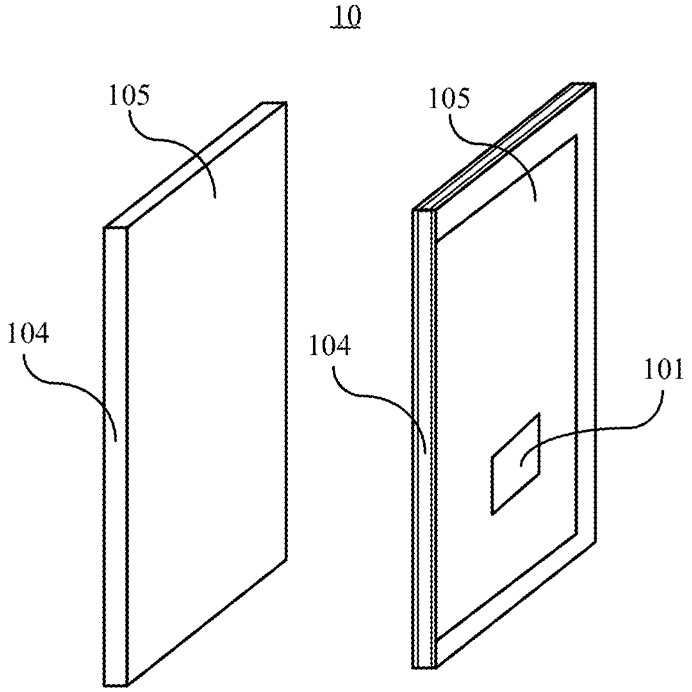
FIG. 4 is a diagram of a structure of a communication apparatus according to an embodiment of this disclosure.

FIG. 4 is a diagram of a structure of the communication apparatus according to an embodiment of this disclosure. The communication apparatus 10 further includes a body. The body may include a middle frame 104 and a backplane 105. The antenna array 101 is disposed on the backplane 105, and the processor 102 and the memory 103 are disposed in the body (not shown in FIG. 4).

The following describes the antenna and the antenna array in embodiments of this disclosure.

Figure 5:
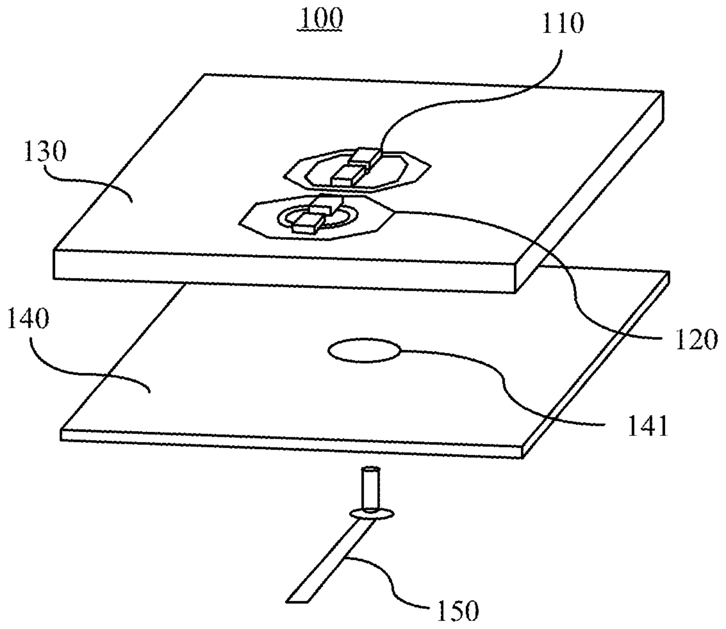
FIG. 5 is a diagram of a structure of an antenna 100 according to an embodiment of this disclosure.
Figure 6:
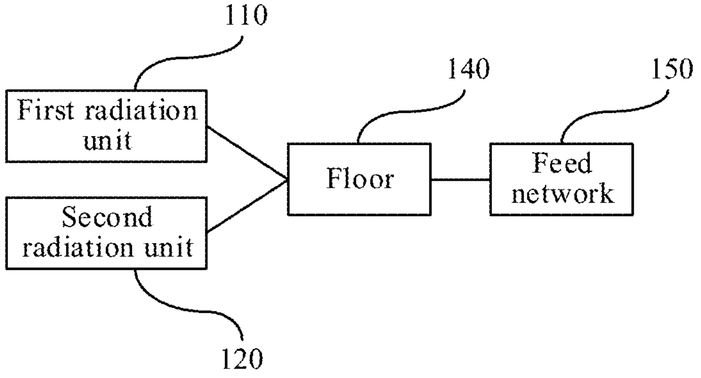
FIG. 6 is a diagram of a signal flow direction of an antenna according to an embodiment of this disclosure.

FIG. 5 is a diagram of a structure of an antenna according to an embodiment of this disclosure. The antenna 100 includes a first radiation unit 110 and a second radiation unit 120, and the antenna 100 may further include a dielectric layer 130 and a floor 140. The floor 140 is configured to provide a grounding function for the antenna 100, to ensure that the antenna 100 operates normally. A first hole 141 is provided on the floor 140, and a feed network 150 may pass through the first hole 141 to be connected to the first radiation unit 110. The dielectric layer 130 may be disposed on the floor 140, and the dielectric layer 130 may be a printed circuit board (PCB) dielectric or a ceramic dielectric. This is not limited herein. The first radiation unit 110 and the second radiation unit 120 are disposed on the dielectric layer 130. FIG. 6 is a diagram of a signal flow direction of the antenna according to an embodiment of this disclosure. A signal from the feed network may pass through the floor 140 to be transmitted by the first radiation unit 110 and the second radiation unit 120, or a signal received by the first radiation unit 110 and the second radiation unit 120 may pass through the floor 140 to be transmitted to the feed network 150.

Figure 7:
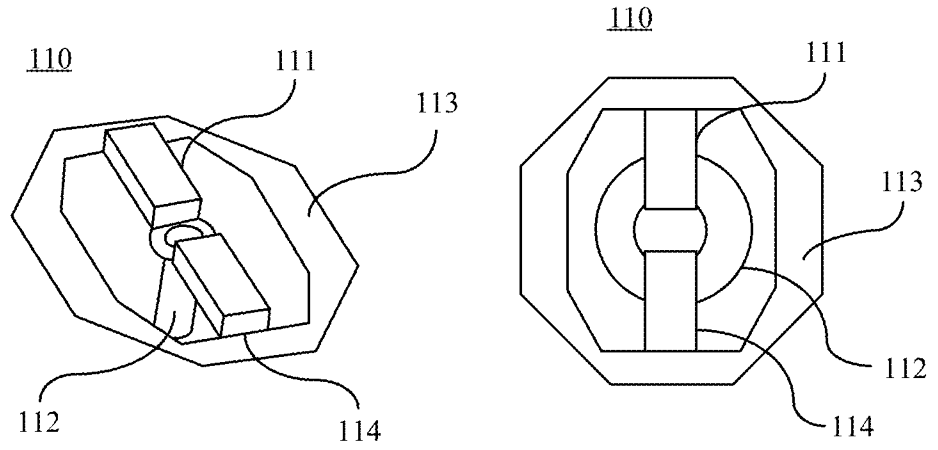
FIG. 7 is a diagram of a structure of a first radiation unit in an antenna according to an embodiment of this disclosure.
Figure 8:
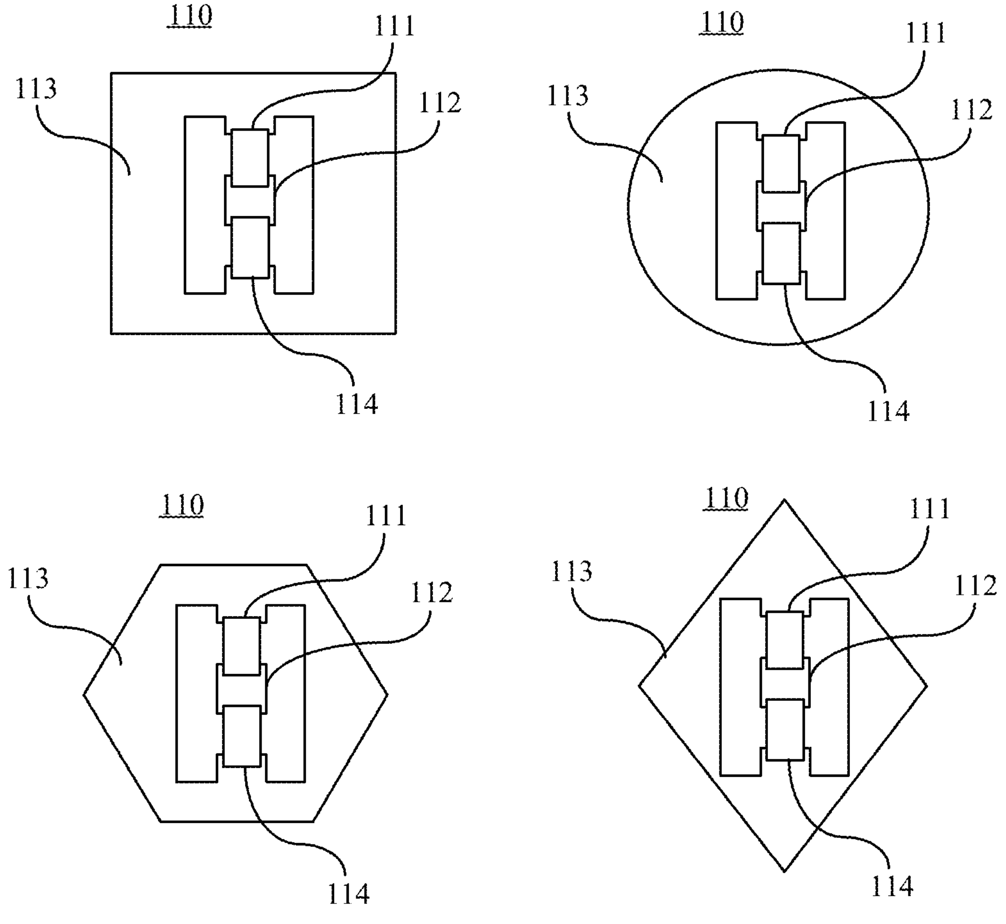
FIG. 8 is a diagram of a structure of a first radiation unit in an antenna according to an embodiment of this disclosure.

FIG. 7 is a diagram of a structure of the first radiation unit according to an embodiment of this disclosure. FIG. 8 is a diagram of a structure of the first radiation unit according to an embodiment of this disclosure. The first radiation unit 110 includes a first switch circuit 111, and the first switch circuit 111 is connected to the feed network 150. The first switch circuit 111 may be a switching transistor, for example, a diode, a triode, a field effect transistor, or an MEMS switch. This is not limited herein. When the first switch circuit 111 is in an on state, a current direction of the first radiation unit 110 is a first direction; or when the first switch circuit 111 is in an off state, a current direction of the first radiation unit 110 is a second direction, to implement beam phase control.

The first radiation unit 110 may further include a feed point 112, a first radiation patch 113, and a third switch circuit 114.

The feed point 112 may be connected to the first switch circuit 111 and the third switch circuit 114, and the feed point 112 may also be connected to the feed network 150. For example, the feed point 112 may pass through the dielectric layer 130 to be connected to the feed network 150 that passes through the first hole 141, in other words, the first switch circuit 111 and the third switch circuit 114 are connected to the feed network 150 through the feed point 112. Because the feed point 112 may pass through the dielectric layer 130, the feed point 112 may also be referred to as a metallic via. It may be understood that, by disposing the feed point 112, it can be ensured that a connection between the second radiation unit 120 and a signal source, namely, the feed network 150, is more reliable, to obtain a stable signal.

The first radiation patch 113 may be connected to the first switch circuit 111 and the third switch circuit 114. The first switch circuit 111 is separately connected to the first radiation patch 113 and the feed point 112, and the third switch circuit 114 is separately connected to the first radiation patch 113 and the feed point 112. In terms of structure, the first radiation patch 113 may be of a ring structure. Therefore, when the first switch circuit is turned on or turned off, a current direction of the first radiation patch can be changed, to implement beam phase control. As shown in FIG. 7 and FIG. 8, the feed point 112 may be located in a ring of the first radiation patch 113. A gap may be formed between the feed point 112 and the first radiation patch 113, to ensure that a gain of the first radiation patch 113 is large enough. The gap may be an annular gap shown in FIG. 7, or may be an H-shaped gap shown in FIG. 8. This is not limited in this disclosure. The gap may alternatively be in any shape. That the feed point 112 is located in the ring of the first radiation patch 113 is merely an example, and is not limited. For example, the feed point 112 may alternatively be located outside the ring of the first radiation patch 113. In terms of shape, a shape of the first radiation patch 113 may be an octagon shown in FIG. 7, or any other shape, for example, a rectangle, a circle, a hexagon, or a rhombus shown in FIG. 8. In this way, the first radiation patch 113 and the second radiation unit 120 can achieve good electromagnetic coupling effect, to ensure a gain of the antenna 100 and implement large-angle beam direction control. For example, a beam direction of the antenna 100 is controlled to deflect in a range such as −30° to 30°, −40° to 40°, −45° to 45°, or −30° to 45°. The beam direction is an included angle direction between a deflected beam direction of the antenna and a beam direction of the antenna that is not deflected. For implementation of the beam direction, refer to the following related descriptions of the second radiation unit 120. Details are not described herein again.

The third switch circuit 114 may be a switching transistor, for example, a diode, a triode, or a field effect transistor. When the first switch circuit 111 is in an on state, the third switch circuit 114 is in an off state, and a current flows from the feed network 150 to the first switch circuit 111, and flows to the first radiation patch 113 through the first switch circuit 111, that is, the current direction of the first radiation unit 110 is the first direction. Alternatively, when the first switch circuit 111 is in an off state, the third switch circuit 114 is in an on state, and a current flows from the feed network 150 to the third switch circuit 114, and flows to the first radiation patch 113 through the third switch circuit 114, that is, the current direction of the first radiation unit 110 is the second direction. If the first switch circuit 111 and the third switch circuit 114 are symmetrically disposed, the current flowing to the first switch circuit 111 is opposite to the current flowing to the third switch circuit 114, in other words, the first direction is opposite to the second direction. If the current direction is defined as the first direction and a beam phase is defined as 0°, in a reverse current case, the current direction is the second direction, and the beam phase is 180°, to implement large-range beam phase control. Certainly, that the current direction is defined as the first direction and the beam phase is defined as 0° is merely an example, and is not limited. For example, the current direction may alternatively be defined as the first direction and the beam phase may alternatively be defined as 180°. Correspondingly, in a reverse current case, the current direction is the second direction, and the beam phase is 0°.

It may be understood that the first radiation unit 110 includes the feed point 112, the first radiation patch 113, and the third switch circuit 114 is merely an example. The first radiation unit 110 may alternatively include any other structure, or the feed point 112, the first radiation patch 113, and the third switch circuit 114 may be replaced with any other structure. The first radiation unit 110 may alternatively be replaced with another name, for example, a first radiator, a first antenna element, a main radiation unit, or a main radiator.

Figure 9:
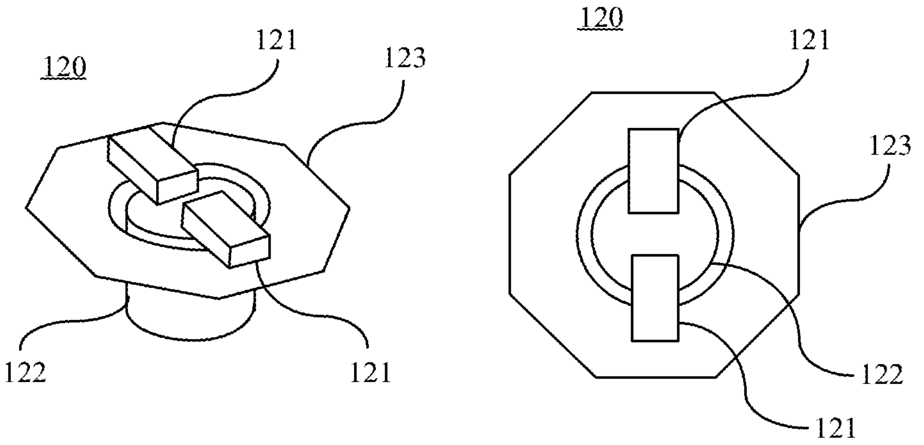
FIG. 9 is a diagram of a structure of a second radiation unit in an antenna according to an embodiment of this disclosure.
Figure 10:
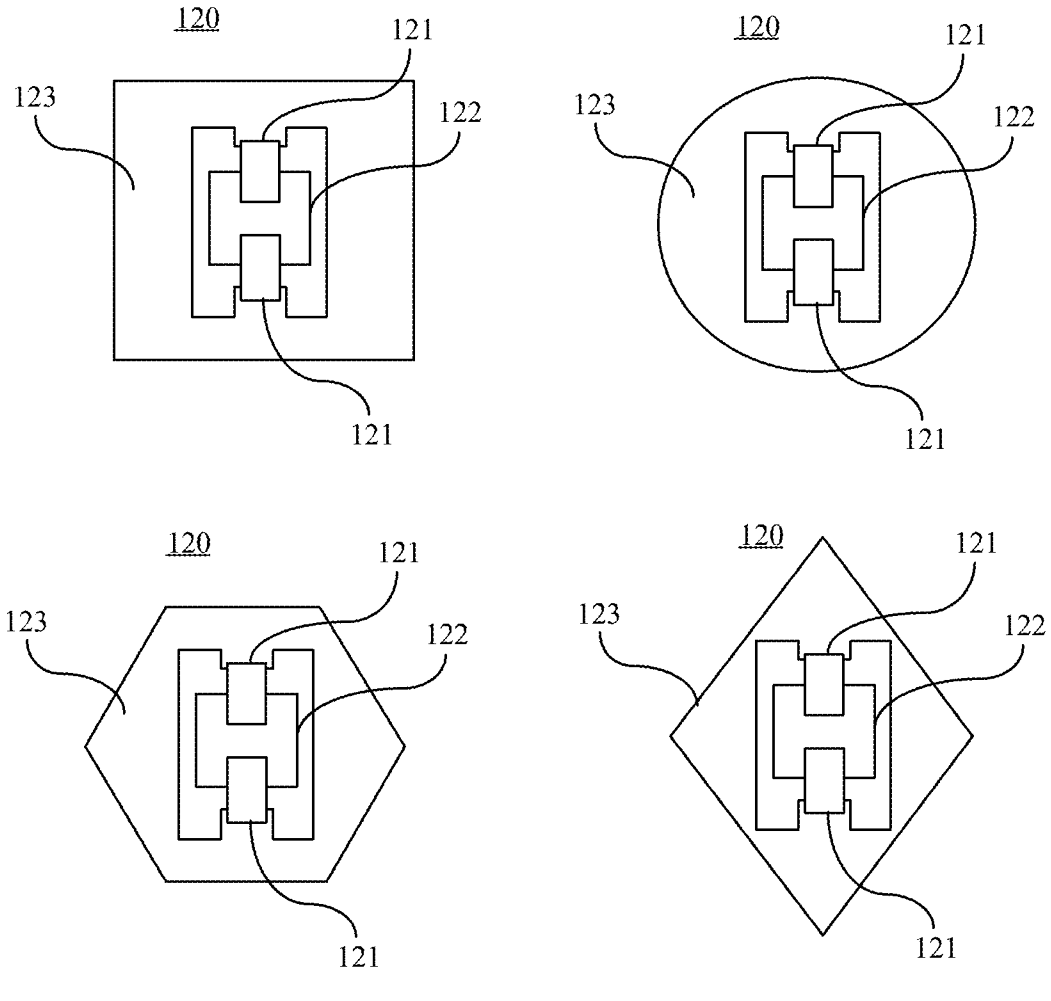
FIG. 10 is a diagram of a structure of a second radiation unit in an antenna according to an embodiment of this disclosure.
Figure 11:
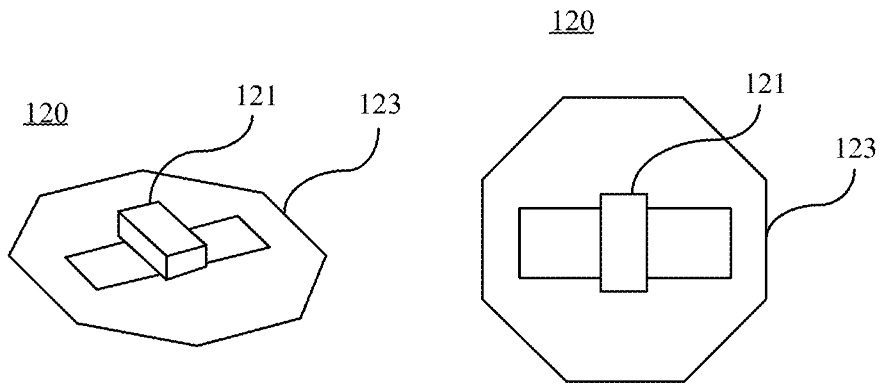
FIG. 11 is a diagram of a structure of a second radiation unit in an antenna according to an embodiment of this disclosure.
Figure 12:
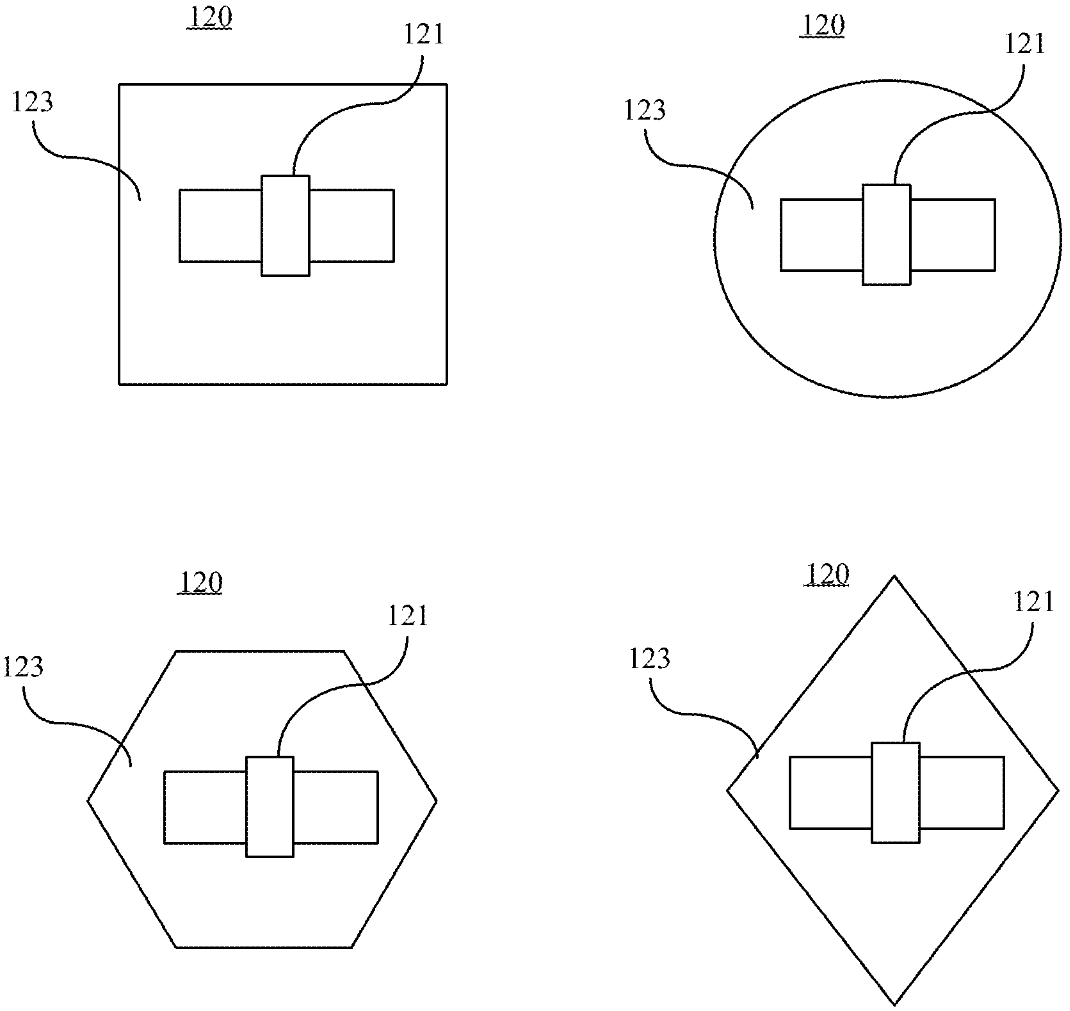
FIG. 12 is a diagram of a structure of a second radiation unit in an antenna according to an embodiment of this disclosure.

FIG. 9 is a diagram of a structure of the second radiation unit according to an embodiment of this disclosure. FIG. 10 is a diagram of a structure of the second radiation unit according to an embodiment of this disclosure. FIG. 11 is a diagram of a structure of the second radiation unit according to an embodiment of this disclosure. FIG. 12 is a diagram of a structure of the second radiation unit according to an embodiment of this disclosure. The second radiation unit 120 includes a second switch circuit 121. The second switch circuit 121 may be a switching transistor, for example, a diode, a triode, a field effect transistor, or an MEMS switch. This is not limited herein. There may be one or more second switch circuits 121, for example, two second switch circuits shown in FIG. 9 to FIG. 12 or more second switch circuits. This is not limited herein. When the second switch circuit 121 is in an on state, a resonance frequency of the second radiation unit 120 is a first frequency, and a beam direction of the second radiation unit 120 is a third direction; or when the second switch circuit 121 is in an off state, a resonance frequency of the second radiation unit is a second frequency, and a beam direction of the second radiation unit 120 is a fourth direction, to implement beam direction control.

In a solution, as shown in FIG. 9, the second radiation unit 120 may further include a ground point 122 and a second radiation patch 123.

The ground point 122 may be connected to the second switch circuit 121, and the ground point 122 may also be connected to the floor 140. For example, the ground point 122 may pass through the dielectric layer 130 to be connected to the floor 140, in other words, the second switch circuit 121 is connected to the floor 140 through the ground point 122, to implement grounding. Because the ground point 122 may pass through the dielectric layer 130, the ground point 122 may also be referred to as a metallic via. By disposing the ground point 122, it can be ensured that the second radiation unit 120 is grounded more reliably, and beam direction control is more stable.

The second radiation patch 123 may be connected to the second switch circuit 121. The second switch circuit 121 is separately connected to the second radiation patch 123 and the ground point 122. In terms of structure, the second radiation patch 123 may be of a ring structure, and a gap may be formed between the ground point 122 and the second radiation patch 123. The ground point 122 may be disposed in a ring of the second radiation patch 123, so that the second switch circuit 121 and a control circuit corresponding to the second switch circuit 121 can be disposed in the gap between the ground point 122 and the second radiation patch 123. The gap may be an annular gap shown in FIG. 9, or the gap may be in any shape, for example, an H-shaped gap shown in FIG. 10. This is not limited in this disclosure. That the ground point 122 is located in the ring of the second radiation patch 123 is merely an example, and is not limited. For example, the ground point 122 may alternatively be located outside the ring of the second radiation patch 123. In terms of shape, a shape of the second radiation patch 123 may be an octagon shown in FIG. 9, or any other shape, for example, a rectangle, a circle, a hexagon, or a rhombus shown in FIG. 10. In this way, the second radiation patch 123 and the first radiation unit 110 may have a better coupling relationship. For example, when both the first radiation patch 113 and the second radiation patch 123 are octagons, two sides that are of the first radiation patch 113 and the second radiation patch 123 and that are close to each other may be parallel, so that better coupling is performed, to ensure a gain of the antenna 100 and implement large-angle beam direction control. For example, the beam direction of the antenna 100 is controlled to deflect in a range such as −30° to 30°, −40° to 40°, −45° to 45°, or −30° to 45°.

It may be understood that, because the second switch circuit 121 may be connected to the floor 140, the second switch circuit 121 may be turned on or turned off to control whether the second radiation unit 120 is grounded, that is, whether the second radiation patch 123 is grounded. If the second radiation unit 120 is grounded, the resonance frequency of the second radiation unit 120 is at a high frequency (e.g. the first frequency). For example, the resonance frequency of the second radiation unit 120 is higher than a resonance frequency of the first radiation unit 110, in other words, a resonance frequency of the second radiation patch 123 is higher than a resonance frequency of the first radiation patch 113, to implement a direction function, namely, a function of guiding a beam to deflect toward the second radiation unit 120 (e.g. the third direction). If the second radiation unit 120 is not grounded, the resonance frequency of the second radiation unit 120 is at a low frequency (e.g. the second frequency). For example, the resonance frequency of the second radiation unit 120 is lower than the resonance frequency of the first radiation unit 110, in other words, the resonance frequency of the second radiation patch 123 is lower than the resonance frequency of the first radiation patch 113, to implement a reverse function, namely, a function of guiding a beam to deflect toward the first radiation unit 110 (e.g. the fourth direction). In other words, the second radiation unit 120 may be grounded or not to conveniently control the beam direction.

Optionally, as shown in FIG. 9 and FIG. 10, a ratio of a size of the ground point 122 to a size of the second radiation patch 123 may be 0.3 to 0.75. Therefore, when the second radiation patch 123 is grounded based on the second switch circuit 121, the resonance frequency of the second radiation patch 123, that is, the first frequency, may be at a higher frequency range compared with the resonance frequency of the first radiation unit 110, so that a better direction function is implemented, and large-angle beam direction control is implemented. In an example in which the ground point 122 is of a cylindrical structure, the size of the ground point 122 may be a diameter of the ground point 122. Alternatively, in an example in which the ground point 122 is of a column structure, the size of the ground point 122 may be any one of a cross section of the ground point 122: a length, a width, and a diagonal distance. In an example in which the second radiation patch 123 is an octagon, the size of the second radiation patch 123 may be a distance between any two parallel sides of the second radiation patch 123. Alternatively, in an example in which the second radiation patch 123 is a circle, the size of the second radiation patch 123 may be a diameter of the second radiation patch 123.

Alternatively, in an example in which the second radiation patch 123 is a rectangle, the size of the second radiation patch 123 may be a length, a width, or a diagonal distance of the second radiation patch 123. Alternatively, in an example in which the second radiation patch 123 is a rhombus, the size of the second radiation patch 123 may be a diagonal distance of the second radiation patch 123. It may be understood that the ratio of the size of the ground point 122 to the size of the second radiation patch 123 is merely an example, and is not limited. The ratio of the size of the ground point 122 to the size of the second radiation patch 123 may alternatively fluctuate based on the foregoing ratio, for example, 0.25 to 0.8, 0.3 to 0.8, 0.25 to 0.75, or 0.2 to 0.85.

In another solution, as shown in FIG. 11, the second radiation unit 120 may further include a second radiation patch 123. The second radiation patch 123 may be connected to the second switch circuit 121. The second switch circuit 121 is connected to different locations of the second radiation patch 123. In terms of structure, a gap is provided in the second radiation patch 123, so that the second radiation patch 123 is of a ring structure. The gap provided in the second radiation patch 123 may be in a straight-line shape, or the gap may be in any shape, for example, a circular gap or an H-shaped gap. This is not limited in this disclosure. Based on the ring structure of the second radiation patch 123, the second switch circuit 121 is connected to different locations inside the ring of the second radiation patch 123. Alternatively, as shown in FIG. 11 and FIG. 12, the second switch circuit 121 is connected to different location outside the ring of the second radiation patch 123. In terms of shape, a shape of the second radiation patch 123 may be an octagon shown in FIG. 11, or any other shape, for example, a rectangle, a circle, a hexagon, or a rhombus shown in FIG. 12. In this way, the second radiation patch 123 and the first radiation unit 110 may have a better coupling relationship, to ensure a gain of the antenna 100 and implement large-angle beam direction control.

It may be understood that, because the second switch circuit 121 is connected to different locations of the second radiation patch 123, the second switch circuit 121 may be turned on or turned off to control a current path of the second radiation unit 120, that is, a current path of the second radiation patch 123. If the second radiation unit 120 is in an on state, a current flows from one end of the second radiation patch 123 to the other end of the second radiation patch 123 through the second switch circuit 121, a path of the current is relatively short, and the resonance frequency of the second radiation unit 120 is at a high frequency (e.g. the first frequency), to implement a direction function, that is, a function of guiding a beam to deflect toward the second radiation unit 120 (e.g. the third direction). If the second switch circuit 121 is in an off state, a current flows from one end of the second radiation patch 123 to the other end of the second radiation patch 123 by bypassing the gap provided in the second radiation patch 123, a path of the current is relatively long, and the resonance frequency of the second radiation unit 120 is at a low frequency (e.g. the second frequency), to implement a reverse function, that is, a function of guiding a beam to deflect toward the first radiation unit 110 (e.g. the fourth direction). In other words, the second switch circuit 121 may be turned on or not to conveniently control the beam direction.

It may be understood that the second radiation unit 120 includes the foregoing structure, for example, includes the second radiation patch 123, or includes the ground point 122 and the second radiation patch 123. The second radiation unit 120 may alternatively include any other structure, or the ground point 122 and the second radiation patch 123 may be replaced with any other structure. The second radiation unit 120 may alternatively be replaced with another name, for example, a second radiator, a second antenna element, a secondary radiation unit, a secondary radiator, a parasitic radiation unit, a parasitic radiator, a parasitic element, or a parasitic antenna element.

Optionally, in a solution, refer to FIG. 7 to FIG. 12. A ratio of a size of the second radiation unit 120 to a size of the first radiation unit 110 is 1.05 to 1.25. In this way, the first radiation unit 110 and the second radiation unit 120 can achieve good electromagnetic coupling effect, to ensure a gain of the antenna 100 and implement large-angle beam direction control. The size of the second radiation unit 120 may be represented by a size of the second radiation patch 123. For implementation of the size of the second radiation patch 123, refer to the related descriptions of the second radiation patch 123. Details are not described again. The size of the first radiation unit 110 may be represented by a size of the first radiation patch 113, which is similar to the second radiation patch 123. In an example in which the first radiation patch 113 is an octagon, the size of the first radiation patch 113 may be a distance between any two parallel sides of the first radiation patch 113. Alternatively, in an example in which the first radiation patch 113 is a circle, the size of the first radiation patch 113 may be a diameter of the first radiation patch 113. Alternatively, in an example in which the first radiation patch 113 is a rectangle, the size of the first radiation patch 113 may be a length, a width, or a diagonal distance of the first radiation patch 113. Alternatively, in an example in which the first radiation patch 113 is a rhombus, the size of the first radiation patch 113 may be a diagonal distance of the first radiation patch 113. It may be understood that the ratio of the size of the second radiation unit 120 to the size of the first radiation unit 110 is merely an example, and is not limited. The ratio of the size of the second radiation unit 120 to the size of the first radiation unit 110 may alternatively fluctuate based on the foregoing ratio, for example, 1 to 1.3, 1.05 to 1.3, 1 to 1.25, or 0.95 to 1.35.

Optionally, in a solution, refer to FIG. 7 to FIG. 12. A ratio of a distance between a center of the first radiation unit 110 and a center of the second radiation unit 120 to a size of the first radiation unit 110 is 1.05 to 1.4. In this way, the first radiation unit 110 and the second radiation unit 120 can achieve good electromagnetic coupling effect, to ensure a gain of the antenna 100 and implement large-angle beam direction control. The center of the first radiation unit 110 may be a center point of the feed point 112 or a center point of the first radiation patch 113. The center of the second radiation unit 120 may be a center point of the ground point 122 or a center point of the second radiation patch 123. It may be understood that the ratio of the distance to the size of the first radiation unit 110 is merely an example, and is not limited. The ratio of the distance to the size of the first radiation unit 110 may alternatively fluctuate based on the foregoing ratio, for example, 1 to 1.45, 1 to 1.4, 1.05 to 1.45, or 0.95 to 1.5.

Figure 13:
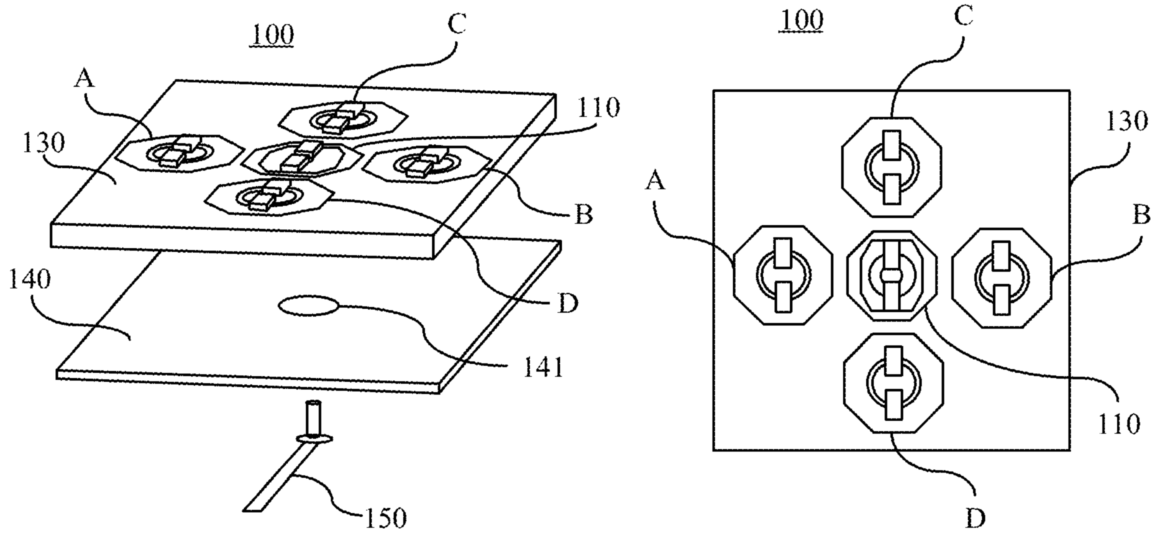
FIG. 13 is a diagram of a structure of an antenna according to an embodiment of this disclosure.

Optionally, in a solution, there may be a plurality of second radiation units 120, and the plurality of second radiation units 120 may be disposed around the first radiation unit 110, to implement multi-beam direction control. In an example, FIG. 13 is a diagram of a structure of the antenna according to an embodiment of this disclosure. Four second radiation units 120 are respectively disposed above, below, on the left, and on the right of the first radiation unit 110. For ease of description, the second radiation unit 120 disposed on the left of the first radiation unit 110 is denoted as a second radiation unit A, and a second switch circuit 121 of the second radiation unit A is denoted as a second switch circuit A1; the second radiation unit 120 disposed on the right of the first radiation unit 110 is denoted as a second radiation unit B, and a second switch circuit 121 of the second radiation unit B is denoted as a second switch circuit B1; the second radiation unit 120 disposed above the first radiation unit 110 is denoted as a second radiation unit C, and a second switch circuit 121 of the second radiation unit C is denoted as a second switch circuit C1; and the second radiation unit 120 disposed below the first radiation unit 110 is denoted as a second radiation unit D, and a second switch circuit 121 of the second radiation unit D is denoted as a second switch circuit D1. If the first switch circuit 111, the third switch circuit 114, and the second switch circuit A1 to the second switch circuit D1 are correspondingly in an off state or an on state, as shown in Table 1, an example of a beam direction and a beam phase of the antenna 100 may be shown in Table 1, and FIG. 14 to FIG. 16.

TABLE 1

| First switch circuit | Third switch circuit | Second switch circuitA1 | Second switch circuit B1 | Second switch circuit C1 | Second switch circuit D1 | Phase | Direction |
|---|---|---|---|---|---|---|---|
| On state | Off state | NA | NA | NA | NA | 0° | NA |
| Off state | On state | NA | NA | NA | NA | 180° | NA |
| NA | NA | On state | On state | On state | On state | NA | Mode 1 |
| NA | NA | On state | Off state | Off state | Off state | NA | Mode 2 |
| NA | NA | Off state | On state | Off state | Off state | NA | Mode 3 |
| NA | NA | Off state | Off state | On state | Off state | NA | Mode 4 |
| NA | NA | Off state | Off state | Off state | On state | NA | Mode 5 |
| NA | NA | On state | Off state | On state | Off state | NA | Mode 6 |
| NA | NA | Off state | On state | On state | Off state | NA | Mode 7 |
| NA | NA | Off state | Off state | On state | On state | NA | Mode 8 |
| NA | NA | On state | Off state | Off state | On state | NA | Mode 9 |

Figure 14:
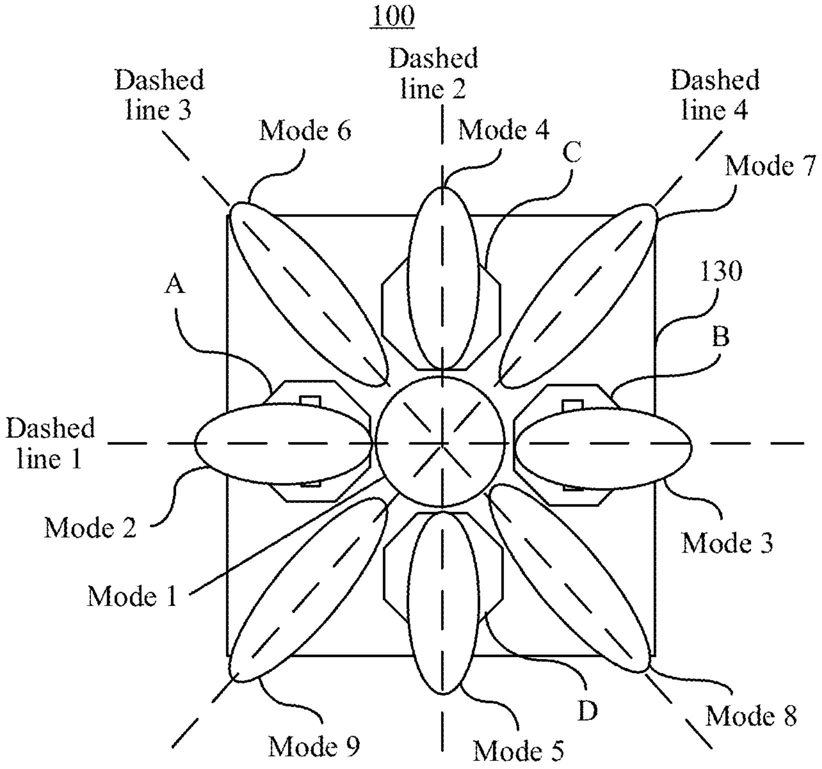
FIG. 14 is a beam directivity pattern of an antenna according to an embodiment of this disclosure.
Figure 15:
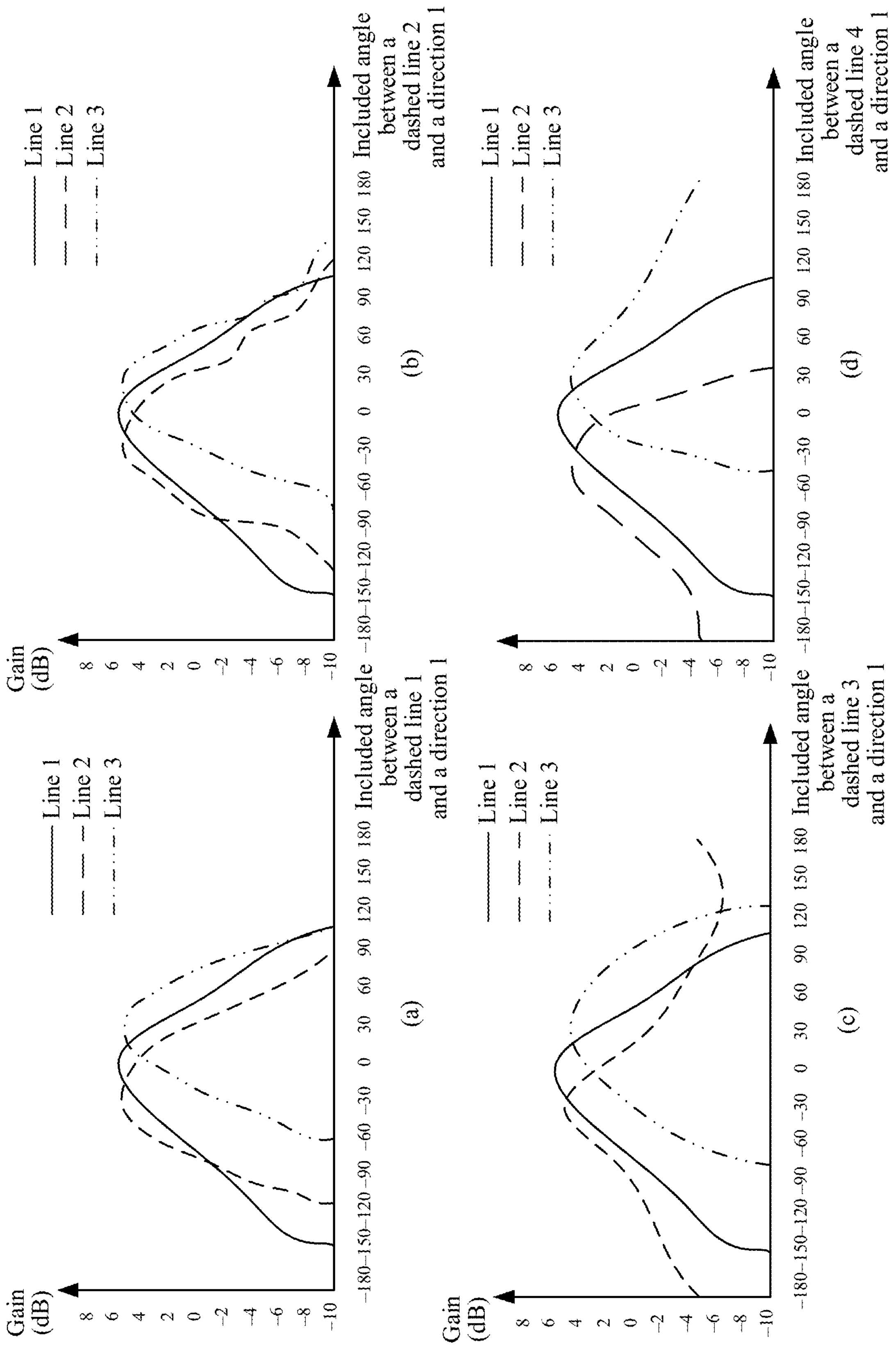
FIG. 15 is a beam directivity pattern of an antenna according to an embodiment of this disclosure.
Figure 16:
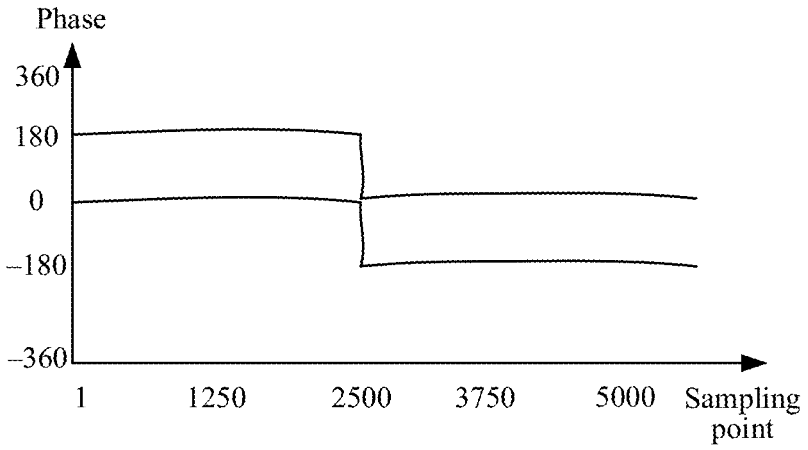
FIG. 16 is an antenna phase image according to an embodiment of this disclosure.

NA in Table 1 indicates no limitation. As shown in FIG. 14, a beam direction of the mode 1 is a direction (denoted as a direction 1) perpendicular to the first radiation unit 110, a beam directivity pattern of the mode 1 is shown in (a) to (d) in FIG. 15, a beam gain curve is a line 1, and a beam gain at 0° is the largest, that is, the beam direction of the mode 1. As shown in FIG. 14, a beam direction of the mode 2 is a direction biased toward the second radiation unit A, a beam directivity pattern of the mode 2 is shown in (a) in FIG. 15, a beam gain curve is a line 2, and a beam gain in a direction of an included angle of −30° between a dashed line 1 and a direction 1 is the largest, that is, the beam direction of the mode 2. As shown in FIG. 14, a beam direction of the mode 3 is a direction biased toward the second radiation unit B, a beam directivity pattern of the mode 3 is shown in (a) in FIG. 15, a beam gain curve is a line 3, and a beam gain in a direction of an included angle of 30° between a dashed line 1 and a direction 1 is the largest, that is, the beam direction of the mode 3. As shown in FIG. 14, a beam direction of the mode 4 is a direction biased toward the second radiation unit C, a beam directivity pattern of the mode 4 is shown in (b) in FIG. 15, a beam gain curve is a line 2, and a beam gain in a direction of an included angle of −30° between a dashed line 2 and a direction 1 is the largest, that is, the beam direction of the mode 4. As shown in FIG. 14, a beam direction of the mode 5 is a direction biased toward the second radiation unit D, a beam directivity pattern of the mode 5 is shown in (b) in FIG. 15, a beam gain curve is a line 3, and a beam gain in a direction of an included angle of 30° between a dashed line 2 and a direction 1 is the largest, that is, the beam direction of the mode 5. As shown in FIG. 14, a beam direction of the mode 6 is a direction biased toward the second radiation unit A and the second radiation unit C, a beam directivity pattern of the mode 6 is shown in (c) in FIG. 15, a beam gain curve is a line 2, and a beam gain in a direction of an included angle of −30° between a dashed line 3 and a direction 1 is the largest, that is, the beam direction of the mode 6. As shown in FIG. 14, a beam direction of the mode 7 is a direction biased toward the second radiation unit B and the second radiation unit C, a beam directivity pattern of the mode 7 is shown in (d) in FIG. 15, a beam gain curve is a line 2, and a beam gain in a direction of an included angle of −30° between a dashed line 4 and a direction 1 is the largest, that is, the beam direction of the mode 7. As shown in FIG. 14, a beam direction of the mode 8 is a direction biased toward the second radiation unit B and the second radiation unit D, a beam directivity pattern of the mode 8 is shown in (c) in FIG. 15, a beam gain curve is a line 2, and a beam gain in a direction of an included angle of 30° between a dashed line 3 and a direction 1 is the largest, that is, the beam direction of the mode 8. As shown in FIG. 14, a beam direction of the mode 9 is a direction biased toward the second radiation unit A and the second radiation unit D, a beam directivity pattern of the mode 9 is shown in (d) in FIG. 15, a beam gain curve is a line 3, and a beam gain in a direction of an included angle of 30° between a dashed line 4 and a direction 1 is the largest, that is, the beam direction of the mode 9. FIG. 16 is a phase image of a beam. It can be learned that a beam phase has two cases when sampling points such as 5000 sampling points are set in a direction related to the beam and a radio frequency signal is an alternating current signal. One case is that the beam phase changes between 0° and 180°, and the other case is that the beam phase changes between 0° and −180°. A phase difference of the two curves is approximately 180°, to implement 1 bit, that is, 0 and 180° phase control.

It may be understood that the four second radiation units are used as an example above, and this is not limited. For example, there may be fewer or more second radiation units. For example, there are eight second radiation units, and the eight second radiation units are distributed around the first radiation unit.

In conclusion, based on the antenna 100 shown in FIG. 5 to FIG. 16, it can be learned that the first switch circuit 111 may be turned on or turned off to control a current direction of the first radiation unit 110, that is, to control a beam phase, and the second switch circuit 121 may be turned on or turned off to control a beam direction, so that the direction and the phase of the beam can be controlled without depending on an active component, thereby reducing costs and power consumption to a maximum extent.

Figure 17:
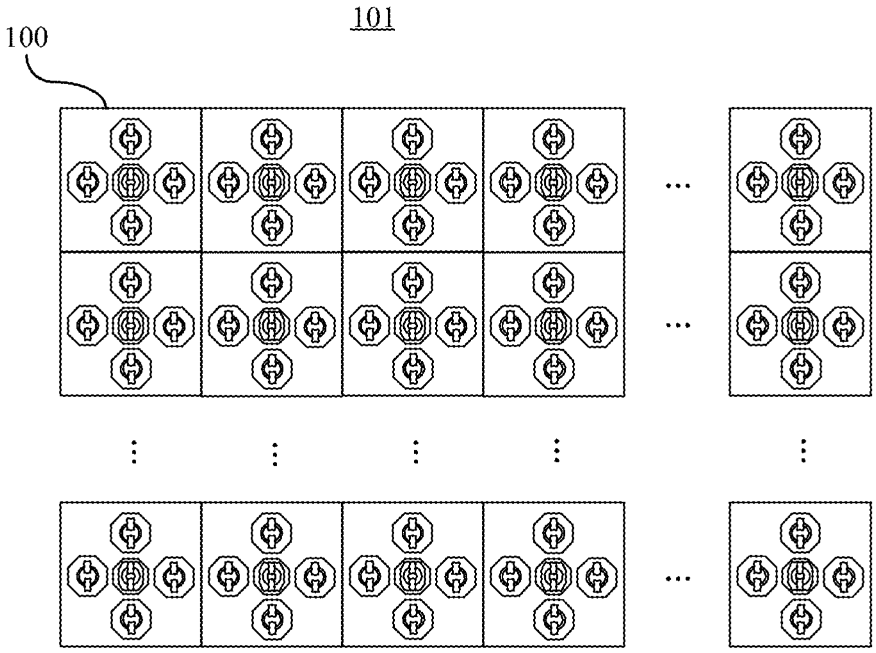
FIG. 17 is a diagram of a structure of an antenna array according to an embodiment of this disclosure.

FIG. 17 is a diagram of a structure of an antenna array according to an embodiment of this disclosure. A plurality of antennas 100 may be arranged in a matrix manner, to form the antenna array 101. In the antenna array 101, there may be N antennas 100 in each row, and there may be M antennas 100 in each column, where N and M are positive integers. For example, each antenna 100 includes one first radiation unit 110 and four second radiation units 120. There are M*N first radiation units 110 and 4*M*N first radiation units 110. Each first radiation unit 110 may control, through one corresponding control circuit (denoted as a control circuit 1, which is not shown in the figure), the first switch circuit 111 and the third switch circuit 114 to be turned on or turned off correspondingly. There are a total of M*N control circuits 1. The second radiation units 120 in each column may control, through one corresponding control circuit (denoted as a control circuit 2, which is not shown in the figure), the second switch circuits 121 to be turned on or turned off correspondingly. There are a total of 2N control circuits 2. The second radiation units 120 in each row may control, through one corresponding control circuit (denoted as a control circuit 3, which is not shown in the figure), the second switch circuits 121 to be turned on or turned off correspondingly. There are a total of 2M control circuits 3. Compared with a manner in which each radiation unit is controlled through one control circuit, the foregoing manner can effectively reduce a quantity of control circuits, thereby reducing complexity and costs.

Figure 18:
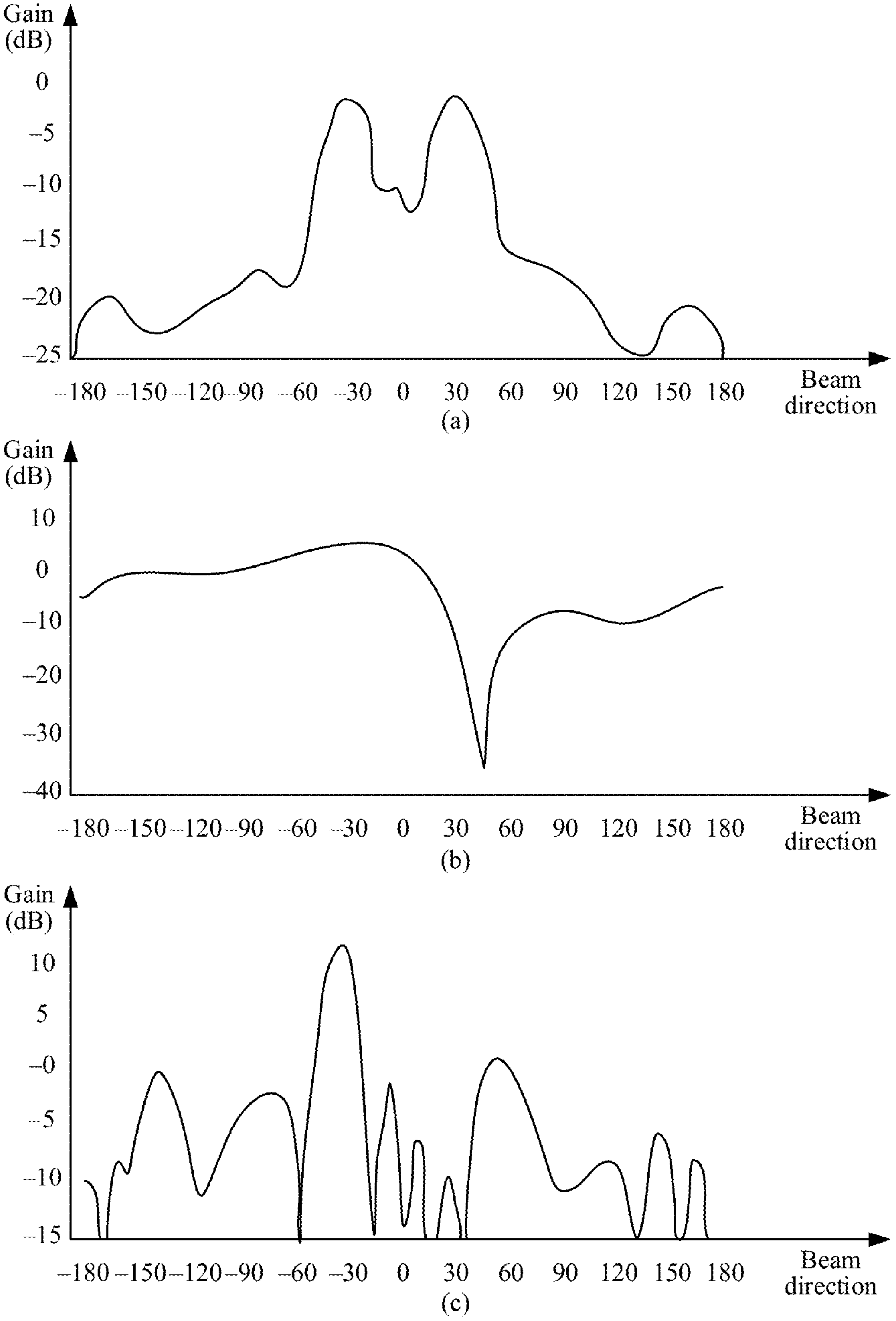
FIG. 18 is a beam directivity pattern of an antenna array according to an embodiment of this disclosure.
Figure 19:
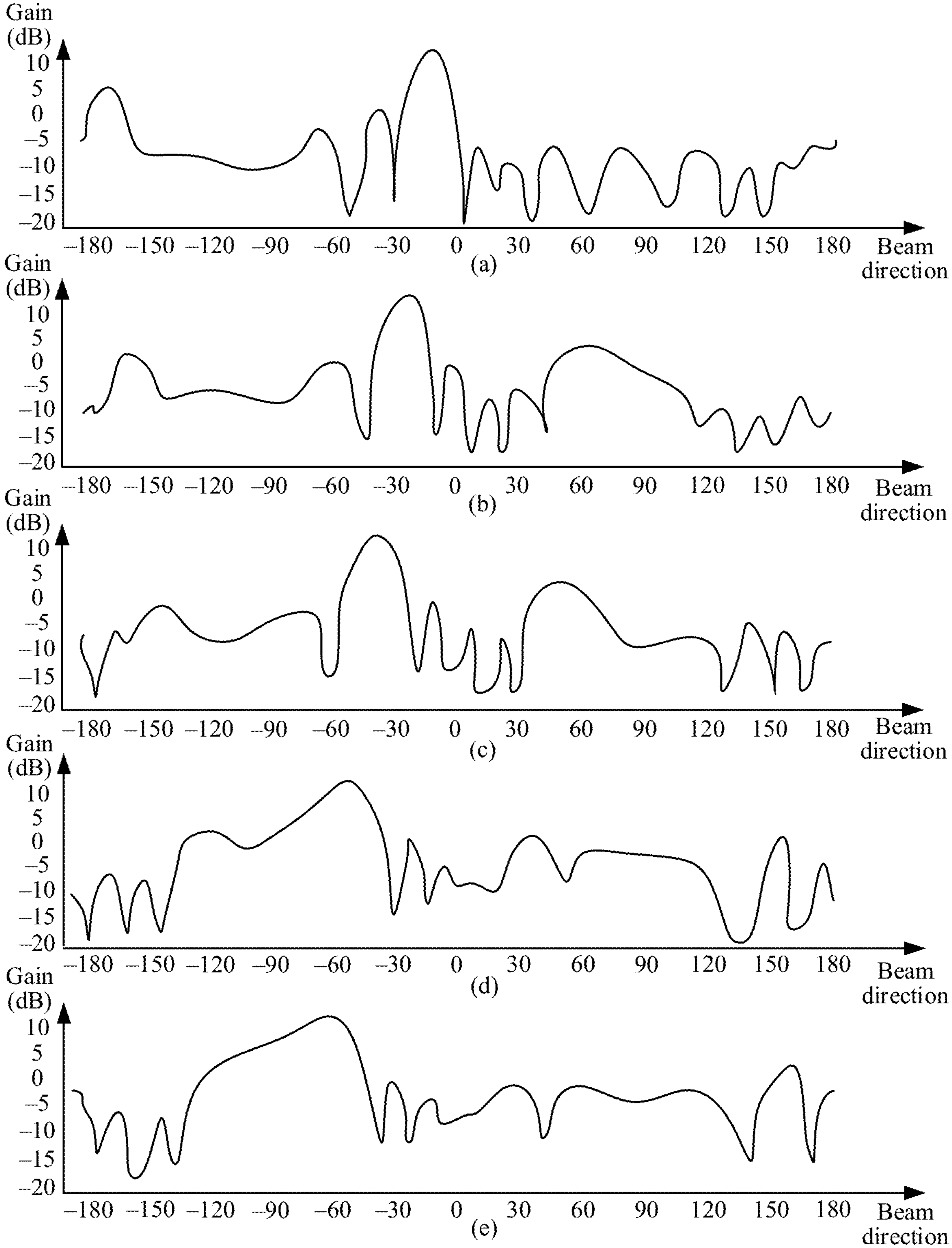
FIG. 19 is a beam directivity pattern of an antenna array according to an embodiment of this disclosure.

It should be noted that, in a case in which the antennas 100 form the antenna array 101, if a beam phase of the first radiation unit 110 changes, a mirror beam may be generated. For example, through 1-bit phase shift, the mirror beam is generated when the beam phase changes between 0° and 180°. The mirror beam is a beam that is generated in an axisymmetric direction of a target beam (e.g. a beam that needs to be sent to a specified direction) and that has a similar size and a similar form as the target beam. For example, (a) in FIG. 18 is an array factor directivity pattern of the antenna array. It can be learned that a beam direction of the antenna array is 35° (the target beam is a beam in a direction of 35°), and a mirror beam with a similar gain is generated in a direction of −35°. As a result, a gain of the antenna array 101 is reduced, and an anti-interference capability of the antenna array 101 is affected. However, when a beam direction of the second radiation unit 120 changes, a negative gain is generated at a beam mirror location. For example, (b) in FIG. 18 is a beam directivity pattern of the antenna. A beam direction of the antenna is 35°, and a negative gain is generated in a direction of −35°. The negative gain may be superimposed with the mirror beam to suppress the mirror beam. In other words, functions of the first radiation unit 110 and the second radiation unit 120 are not independent of each other, and function cooperation between the first radiation unit 110 and the second radiation unit 120 can suppress the mirror beam, so that a beam directivity pattern of the antenna array 101 has no grating lobe. For example, (c) in FIG. 18 is a beam directivity pattern of the antenna array, that is, a grating lobe in a direction of 30° is suppressed. In this way, a gain of the antenna array 101 can be improved, and an anti-interference capability of the antenna array 101 can be enhanced. For example, (a) in FIG. 19 is a beam directivity pattern of the antenna array in a beam direction of 15°, (b) in FIG. 19 is a beam directivity pattern of the antenna array in a beam direction of 25°, (c) in FIG. 19 is a beam directivity pattern of the antenna array in a beam direction of 38°, (d) in FIG. 19 is a beam directivity pattern of the antenna array in a beam direction of 51°, and (e) in FIG. 19 is a beam directivity pattern of the antenna array in a beam direction of 60°. It can be learned that, in a mirror direction of the beam, all grating lobes are suppressed, and a suppression gain exceeds 10 decibels (dBs).

Optionally, a ratio of a distance between two adjacent antennas 100 in the plurality of antennas 100 to a wavelength is 0.7 to 1. The distance between the two adjacent antennas 100 may be a distance between center points of the two adjacent antennas 100, and the wavelength is a wavelength corresponding to an operating frequency of the antenna array 101. The operating frequency of the antenna array 101 corresponds to a plurality of wavelengths, and the wavelength may be one of the plurality of wavelengths. This is not limited. It should be noted that, in a conventional phased array antenna 01, two adjacent antennas 100 need to be arranged at a distance of 0.5 times a wavelength, to suppress a mirror beam, so that an array directivity pattern has no grating lobe. For the antenna array 101 according to the second aspect, each antenna 100 in the antenna array 101 may suppress a mirror beam through function cooperation between two radiation units of the antenna 100, for example, the first radiation unit 110 and the second radiation unit 120, so that an array directivity pattern has no grating lobe. In this way, the distance between the two adjacent antennas 100 in the antenna array 101 may be larger. For example, the distance is 0.7 to 1 wavelength. Under a same aperture of the antenna 100, a quantity of antennas 100 in the antenna array 101 is less than a quantity of antennas 100 in the conventional phased array antenna 01. A 0.75 wavelength is used as an example. A size of each antenna 100 in the antenna array 101 in this disclosure is 2.25 times (0.75*0.75/0.5*0.5=2.25) the conventional antenna 100 (an antenna 100 with a 0.5-time wavelength arrangement). In a same area, the quantity of antennas 100 in the antenna array 101 in this disclosure is about half of the quantity of antennas 100 in the conventional antenna array 101, for example, 44.5%(1/2.25). Correspondingly, a quantity of control circuits required by the antenna array 101 in this disclosure is also about half of a quantity of control circuits required by the conventional antenna array 101, to effectively reduce complexity and costs.

In embodiments of this disclosure, a performance parameter of each antenna in the antenna module meets a corresponding mobile terminal communication standard. For the mobile terminal communication standard, refer to a related standard published in the conventional technology. Details are not described in embodiments.

The foregoing descriptions are merely implementations of this disclosure, but are not intended to limit the protection scope of this disclosure. Any variation or replacement readily figured out by persons skilled in the art within the technical scope disclosed in this disclosure shall fall within the protection scope of this disclosure.

Embodiments in this specification are all described in a progressive manner. Each embodiment focuses on a difference from other embodiments. For same or similar parts in embodiments, refer to these embodiments.

Although embodiments of embodiments of this disclosure have been described, persons skilled in the art may make other changes and modifications to these embodiments once they learn of the basic inventive concept. Therefore, the protection scope of this disclosure includes the preferred embodiments and all changes and modifications falling within the scope of the embodiments of this disclosure.

The antenna module and the electronic device provided in this disclosure are described in detail above. Examples are used in this specification to describe principles and implementations of this disclosure. The foregoing embodiments are merely used to help understand the method and the core idea of this disclosure. In addition, persons of ordinary skill in the art may make variations to the implementations and the disclosure scope according to the idea of this disclosure. In conclusion, the content of this specification should not be construed as a limitation on this disclosure.

The foregoing descriptions are merely implementations of this disclosure, but are not intended to limit the protection scope of this disclosure. Any variation or replacement within the technical scope disclosed in this disclosure shall fall within the protection scope of this disclosure. Therefore, the protection scope of this disclosure shall be subject to the protection scope of the claims.

What is claimed is:

1. An antenna, comprising:

a first radiation unit; and a second radiation unit coupled to the first radiation unit;

the first radiation unit comprises a first switch circuit, the first switch circuit is connected to a feed network, when the first switch circuit is in an on state a current direction of the first radiation unit is a first direction, or when the first switch circuit is in an off state the current direction of the first radiation unit is a second direction; and the second radiation unit comprises a second switch circuit, a second radiation patch, a floor, and a ground point connected to the floor, the second switch circuit being separately connected to the second radiation patch and to the ground point, and when the second switch circuit is in an on state a resonance frequency of the second radiation unit is a first frequency and a beam direction of the second radiation unit is a third direction, or when the second switch circuit is in an off state the resonance frequency of the second radiation unit is a second frequency and the beam direction of the second radiation unit is a fourth direction.

2. The antenna according to claim 1, wherein the second radiation patch comprises a ring structure.

3. The antenna according to claim 1, wherein a shape of the second radiation patch is one of: an octagon, a rectangle, a circle, or a rhombus.

4. The antenna according to claim 1, wherein a ratio of a size of the ground point to a size of the second radiation patch is 0.3 to 0.75.

5. The antenna according to claim 1, wherein the first direction is opposite to the second direction.

6. The antenna according to claim 5, wherein the first radiation unit further comprises a feed point, the feed point is connected to the feed network, and the first switch circuit is connected to the feed point.

7. The antenna according to claim 6, wherein the first radiation unit further comprises a first radiation patch, and the first switch circuit is separately connected to the first radiation patch and to the feed point.

8. The antenna according to claim 7, wherein the first radiation patch comprises a ring structure.

9. The antenna according to claim 7, wherein a shape of the first radiation patch is one of: an octagon, a rectangle, a circle, or a rhombus.

10. The antenna according to claim 1, wherein a ratio of a size of the second radiation unit to a size of the first radiation unit is 1.05 to 1.25.

11. The antenna according to claim 1, wherein a ratio of a distance between a center of the first radiation unit and a center of the second radiation unit to a size of the first radiation unit is 1.05 to 1.4.

12. The antenna according to claim 1, wherein the second radiation unit comprises a plurality of second radiation units.

13. An antenna array, comprising:

a plurality of antennas, the plurality of antennas comprising a first antenna, the first antenna comprising:

a first radiation unit; and a second radiation unit coupled to the first radiation unit;

the first radiation unit comprises a first switch circuit, the first switch circuit is connected to a feed network, when the first switch circuit is in an on state a current direction of the first radiation unit is a first direction, or when the first switch circuit is in an off state the current direction of the first radiation unit is a second direction; and the second radiation unit comprises a second switch circuit, a second radiation patch, a floor, and a ground point connected to the floor, the second switch circuit being separately connected to the second radiation patch and to the ground point, and when the second switch circuit is in an on state a resonance frequency of the second radiation unit is a first frequency and a beam direction of the second radiation unit is a third direction, or when the second switch circuit is in an off state the resonance frequency of the second radiation unit is a second frequency and the beam direction of the second radiation unit is a fourth direction.

14. The antenna array according to claim 13, wherein:

a ratio of a size of the second radiation unit to a size of the first radiation unit is 1.05 to 1.25; and a ratio of a distance between a center of the first radiation unit and a center of the second radiation unit to a size of the first radiation unit is 1.05 to 1.4.

15. The antenna array according to claim 13, wherein a ratio of a distance between two adjacent antennas in the plurality of antennas to a wavelength is 0.7 to 1, and the wavelength is a wavelength corresponding to an operating frequency of the antenna array.

16. The antenna array according to claim 13, wherein the second radiation patch comprises a ring structure.

17. The antenna array according to claim 13, wherein a shape of the second radiation patch is one of: an octagon, a rectangle, a circle, or a rhombus.

18. The antenna array according to claim 13, wherein a ratio of a size of the ground point to a size of the second radiation patch is 0.3 to 0.75.

19. The antenna array according to claim 13, wherein the first radiation unit further comprises a first radiation patch, and the first switch circuit is separately connected to the first radiation patch and to the feed point.

20. The antenna array according to claim 13, wherein a shape of the first radiation patch is one of: an octagon, a rectangle, a circle, or a rhombus.

* * * * *